United States Patent [19]

Kirihara et al.

[11] Patent Number: 4,857,155

[45] Date of Patent: Aug. 15, 1989

[54] PROCESS OF SEPARATION OF HAFNIUM FROM ZIRCONIUM BY MOLTEN SALT ELECTROLYSIS

[75] Inventors: Tomoo Kirihara; Ippei Nakagawa, both of Aichi; Yoshinobu Seki; Yutaka Honda, both of Ibaraki, all of Japan

[73] Assignee: Mitsubishi Nuclear Fuel Company, Ltd., Tokyo, Japan

[21] Appl. No.: 195,623

[22] Filed: May 17, 1988

[30] Foreign Application Priority Data

May 27, 1987 [JP] Japan .................. 62-130655

[51] Int. Cl.$^4$ ............ C25B 1/24; C25C 3/26
[52] U.S. Cl. .................. 204/61; 204/64 T; 204/71
[58] Field of Search .......... 204/64 T, 71, 61

[56] References Cited

U.S. PATENT DOCUMENTS

| 3,098,805 | 7/1963 | Ervin, Jr. et al. | 204/64 T |
| 3,600,284 | 8/1971 | Martinez et al. | 204/64 T X |
| 4,443,306 | 4/1984 | Armand et al. | 204/64 T |
| 4,588,485 | 5/1986 | Cohen et al. | 204/64 T X |

OTHER PUBLICATIONS

Steinberg, M. A. et al., "Extractive Metallurgy of Zirconium by the Electrolysis of Fused Salts", J.E.C.S., Feb. 1954, vol. 101, #2, pp. 63–78.

*Primary Examiner*—Donald R. Valentine
*Attorney, Agent, or Firm*—James Creighton Wray

[57] ABSTRACT

A process of separation of hafnium from zirconium by molten salt electrolysis in which zirconium tetrachloride with ordinary hafnium tetrachloride content is dissolved in a molten salt and the zirconium tetrachloride is electrolytically reduced to zirconium trichloride with lower hafnium content at a cathode in the molten salt and hafnium tetrachloride is remained. Next, the cathode on which the zirconium trichloride is formed by the cathode reaction is used as an anode. The electrolytic reduction of zirconium tetrachloride at another cathode in the molten salt is carried out and at the same time the zirconium trichloride formed on the anode is oxidized to zirconium tetrachloride with a low hafnium content and the zirconium tetrachloride is evaporated for separation. The obtained zirconium tetrachloride containing a low hafnium content is suitable for production of reactor grade zirconium containing about 100 ppm of hafnium.

2 Claims, 2 Drawing Sheets

PROCESS OF SEPARATION OF HAFNIUM FROM ZIRCONIUM BY MOLTEN SALT ELECTROLYSIS

BACKGROUND OF THE INVENTION

The present invention relates to a process of separation of hafnium from zirconium by molten salt electrolysis which produces zirconium trichloride and zirconium tetrachloride with a low hafnium content suitable for production of reactor grade zirconium containing about 100 ppm of hafnium.

Zirconium ore containing generally 2~4 wt% of hafnium. In conventional technical processes of separation of hafnium from zirconium, one is a solvent extraction process using methyl isobutyl ketone as a solvent for thiocyanic acid solution (J. W. Ramsey, W. K. Whitson Jr.: Production of Zirconium at Y-12, AEC Report Y-817, Oct. 12, 1951). And the other is an extractive distillation process in which vapors of zirconium tetrachloride and hafnium tetrachloride are absorbed selectively by countercurrent circulation of a fused solvent consisting of aluminium trichloride and potassium chloride and are separated continuously from each other in a distilling column (French Pat. No. 7340395, Japanese Patent Publication No. 20279 of 1978). And U.S. Pat. No. 2797485 discloses a process of separation of hafnium from zirconium tetrachloride concerned with reduction of zirconium tetrachloride to zirconium trichloride using a reducing agent and with distillation of hafnium tetrachloride.

However, in the above mentioned solvent extraction process, the recovery of secondary reaction products is expensive owing to its large equipment scale and its use of a large quantity of chemicals. In the extractive distillation process, the running cost is lower than that of the solvent extraction process owing to its simple process and its possible recovery and reuse of the fused solvent, but the cost of equipment is high because of its tall and stout distilling column required. Moreover, the reduction process is not yet industrialized owing to its difficult recovery of the reducing agent used.

On the other hand, as mentioned above, zirconium ore contains generally 2~4 wt% of hafnium. As the standard free energies of chlorination reaction of both oxides are slightly different and hafnium tetrachloride is more stable than that of zirconium, a hafnium content in the chlorides is almost the same as that of the ore. Both tetrachlorides of zirconium and hafnium are starting materials for production of zirconium and hafnium metals. As the thermal neutron absorption cross section of hafnium is very large, a hafnium content in zirconium used for a nuclear reactor must be suppressed to about 100 ppm.

BRIEF SUMMARY OF THE INVENTION

An object of the present invention is to provide a process of separation of hafnium from zirconium in which zirconium trichloride is obtained.

Another object of the present invention is to provide a process of separation of hafnium from zirconium in which zirconium tetrachloride with a low hafnium content is obtained.

According to the present invention, there is provided as a basic invention a process of separation of hafnium from zirconium by molten salt electrolysis comprising of the steps:

(a) dissolving zirconium tetrachloride containing hafnium tetrachloride in naturally existing ratio in a molten salt, and (b) forming zirconium trichloride containing a lower content of hafnium than that in said zirconium tetrachloride at a cathode by electrolytic reduction of said zirconium tetrachloride in said molten salt.

Further, the present invention provides as a second invention a process of separation of hafnium from zirconium by molten salt electrolysis comprising of the steps:

(a) dissolving zirconium tetrachloride containing hafnium tetrachloride in naturally existing ratio in a molten salt, (b) forming zirconium trichloride containing a lower content of hafnium than that in said zirconium tetrachloride at a cathode by electrolytic reduction of said zirconium tetrachloride in said moltent salt, (c) using said cathode on which said zirconium trichloride is formed as an anode with another cathode, and (d) carrying out said electrolytic reduction of zirconium tetrachloride at said another cathode in said molten salt and at the same time oxidizing said zirconium trichloride on said anode to zirconium tetrachloride of a low hafnium content and then evaporating said zirconium tetrachloride for separation.

Thus, the second invention is available to raise the grade of separation of hafnium from zirconium by the above mentioned constitution.

DETAILED DESCRIPTION OF THE INVENTION

Figure 1:
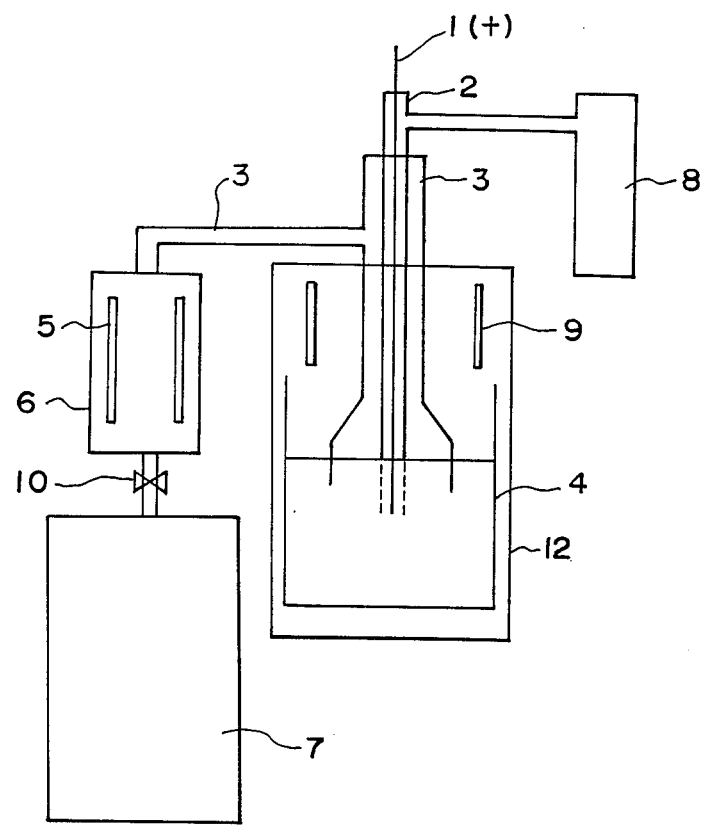

The present invention will be now described in detail.

(I) In the basic invention, as mentioned above, zirconium trichloride with lower hafnium content is deposited on the cathode by electrolytic reduction of zirconium tetrachloride with an ordinary hafnium and on the other hand the hafnium tetrachloride is remained in the molten salt. Thus, the zirconium trichloride which has a lower hafnium content can be separated.

In the second invention the electrolysis is carried out in the same molten salt as that of the basic invention with an anode that is used as the cathode for the basic invention, on which zirconium trichloride of a lower hafnium content is deposited, together with another new cathode. In order to keep the concentration of zirconium tetrachloride in the molten salt during electrolysis zirconium tetrachloride with an ordinary hafnium content is introduced to the cell under slightly higher pressure than an equilibrium pressure of zirconium tetrachloride in the molten salt. Thus, zirconium trichloride of a lower hafnium content is formed at the cathode by electrolytic reduction and simultaneously zirconium tetrachloride of a low hafnium content in gaseous state evolves at the anode by electrolytic oxidation with pressure much higher than equilibrium pressures of zirconium tetrachloride and hafnium tetrachloride is remained in the molten salt. The gaseous zirconium tetrachloride evolved from the anode is recovered by condensation. As shown in examples, thus zirconium tetrachloride of a low hafnium content is obtained in high yield.

When zirconium trichloride oxidized on the anode decreases and that reduced on the cathode increases in volume, polarities of the cathode and the anode are exchanged and the electrolysis mentioned in the second invention is repeated. Consequently, zirconium tetrachloride containing a low concentration hafnium is evaporated to be condensed and at the same time hafnium tetrachloride is concentrated in the molten salt.

(II) When carbon is used as the anode and a carbon, stainless steel rod or a low carbon steel rod as the cathode, the electrolytic reaction of the process of separation of hafnium from zirconium disclosed by the present invention will be described.

First, in the basic invention, electrolytic reaction for the formation of the zirconium trichloride is as follows:

$$\text{cathode; } 2Zr^{4+} + 2e^- = 2Zr^{3+} \quad (1)$$

$$\text{anode; } 2Cl^- = 2e^- + Cl_2 \quad (2)$$

Consequently, $ZrCl_3$ is formed at the cathode and $Cl_2$ is generated at the anode. The whole reaction is as follows:

$$2ZrCl_4 \rightarrow 2ZrCl_3 + Cl_2 \quad (3)$$

In the second invention, since the cathode of the basic invention functions as an anode, the reaction at the anode is as follows:

$$ZrCl_3 + Cl = ZrCl_4 + e^- \quad (4)$$

The reaction at the cathode is the same as that of (1). That is, at the cathode zirconium trichloride is formed and at the same time zirconium trichloride on the anode is oxidized and evaporates as zirconium tetrachloride to be separated.

On the other hand, the electrolytic reaction of hafnium is similar to that of zirconium as follows:

$$\text{cathode; } 2Hf^{4+} + 2e^- = 2Hf^{3+} \quad (1')$$

$$\text{anode; } 2Cl^- = Cl_2 = 2e^- \quad (2')$$

and the whole reaction is as follows:

$$2HfCl_4 \rightarrow 2HfCl_3 + Cl_2 \quad (3')$$

But it will be described as an example that electrolysis can be carried out under condition of no occurrence of such a reduction reaction.

The standard potentials (chlorine basis) of zirconium tetrachloride and hafnium tetrachloride in NaCl—KCl (50:50 mol) molten salt are empirically determined, and the following equations for standard potentials based upon finite dilution are obtained in the temperatures below 850° C. (SAKAKURA, KIRIHARA, DENKA., VOL. 36, p 305, 320(1968)).

$HfCl_3$ and $HfCl_4$ are $$\overset{O}{E}_i Hf/Hf^{3+} = -(2.97 - 8.5 \times 10^{-4}T)$$

$$\overset{O}{E}_i Hf/Hf^{4+} = -(2.7 - 6.1 \times 10^{-4}T)$$

$ZrCl_3$ and $ZrCl_4$ are $$\overset{O}{E}_i Zr/Zr^{3+} = -(2.69 - 6.9 \times 10^{-4}T)$$

$$\overset{O}{E}_i Zr/Zr^{4+} = -(2.47 - 6.5 \times 10^{-4}T)$$

By using the standard potential values mentioned above, the standard potentials $E_iHf^{3+}/Hf^{4+}$ and $E_iZr^{3+}/Zr^{4+}$ of the corresponding electrochemical reactions (3') and (3) are evaluated at the temperatures 450° C. and 600° C. respectively. The respective differences are $-0.52$ volt and $-0.62$ volt, and the absolute value of the potential of $E_iHf^{3+}/Hf^{4+}$ is large enough to separate them. These values are differences of the standard potentials, and accordingly they are calculated from the values extrapolated to 100% concentration of zirconium- or hafnium tetrachloride in the molten salt.

Since, even at the termination of the actual electrolysis, the concentration of zirconium tetrachloride is higher than that of hafnium tetrachloride, the difference of the electrochemical potentials between them is larger than the values mentioned above. Accordingly, by keeping absolute values of the cathode potential below the reduction potential of tetrachloride to trichloride for hafnium, zirconium tetrachloride can be reduced to zirconium trichloride.

(III) It is known that when zirconium tetrachloride is dissolved in a molten salt containing alkali metal chlorides, vapor pressure decreases below that of the solid in the same temperature because of the formation of a double salt such as $Na_2ZrCl_6$, $K_2ZrCl_6$, etc. Hafnium is also thought to behave in a similar manner to above (G. J. Kipouros and S. N. Flengas, Can. J. Chem., Vol. 59, p 990 (1981); Vol. 61, p 2183 (1983)).

In the present invention, free energies of dissolution of zirconium tetrachloride and hafnium tetrachloride in NaCl—KCl of molten state are evaluated from the standard electrochemical potential values based on infinite dilution of zirconium and hafnium tetrachloride (SAKAKURA, KIRIHARA, DENKA., Vol. 36, p 305, 320 (1968)) and the respective standard free energy values.

Further, vapor pressure formulas of zirconium- and hafnium tetrachloride in NaCl—KCl molten salt were evaluated from empirical formula of the vapor pressure of the respective solid and free energies of dissolution above obtained.

Consequently, as shown in Table 1, it has become apparent that in the concentration below 28 mol%, the vapor pressure of zirconium tetrachloride is higher than that of hafnium tetrachloride at the same concentration in contrast to the case of solid phase.

The phenomena above mentioned occur because of a heat of dissolution of hafnium tetrachloride larger than that of zirconium tetrachloride. It is reasoned to be due to the fact that $HfCl_6^{2-}$ ion is more stable than $ZrCl_6^{2-}$ ion. Therefore, it has become apparent that separation efficiency by distillation in the molten salt containing chlorides of alkali or alkaline earth metals which form $ZrCl_6^{2-}$ and $HfCl_6^{2-}$ is better than in solid mixture.

Further, it is obvious from Table 1 that in the second invention mentioned in the above item (I) zirconium tetrachloride formed in gaseous state at the anode evaporated rapidly with higher pressure than that in the molten salt. Therefore, zirconium tetrachloride of low hafnium content can be condensed and yielded.

Table 1 shows that the vapor pressures (mmHg) of zirconium- and hafnium tetrachloride and those dissolved in NaCl—KCl (50:50 mol) by 6 wt% at 640° C. are as follows:

TABLE 1

| $ZrCl_4$ | $HfCl_4$ | 6 wt % $ZrCl_4$ | 6 wt % $HfCl_4$ |
| --- | --- | --- | --- |
| 700.510 | 1,107.870 | 757.5 | 126.3 |

The molten salt usable in the present invention is one kind of compound or a mixture of two or more kinds of compounds selected from the group comprising halide salts which are less noble (the absolute value of the standard potential is larger than zirconium tetrachloride, i.e. chlorides and fluorides of alkali or alkaline earth metals).

The present invention will be described concretely by examples, but the following examples do not limit the scope of the present invention.

EXAMPLE 1

In this example, there will be described the separation effect in the case where electrolysises of the basic invention and the second invention are carried out in the same molten salt.

Figure 2:
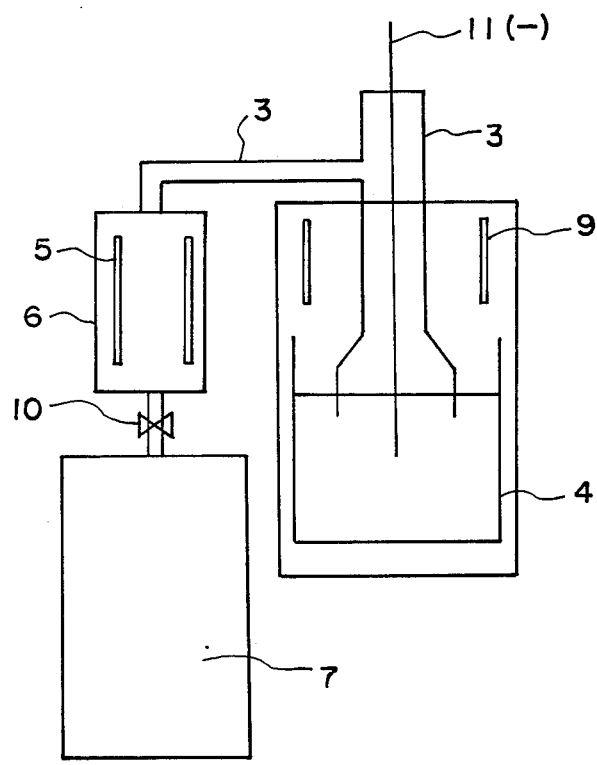

FIG. 1 is a schematic illustration of apparatus used in one case of the basic invention. In FIG. 2, an anode used for the electrolysis of the second invention is illustrated together with the same apparatus in FIG. 1.

First in the basic invention, 110 g of zirconium tetrachloride purified from commercially available zirconium tetrachloride by sublimation and 1,720 g of dehydrated NaCl—KCl (50:50 mol) are introduced into a graphite crucible 4 with inside diameter 150 mm. The total amount is 1,830 g. In order to avoid loss of the zirconium tetrachloride, contents of the crucible 4 are heated in a rate of about 2° C./min. between 200~300° C., kept at 300° C. for 30 min. and then heated to 650° C. to be dissolved. In this case, the concentration of the zirconium tetrachloride is 6 wt%.

Chlorine gas evolving at a graphite anode 1 is stored in a chlorine collector 8 through an anode jacket tube 2. In the lower part of this jacket tube 2, there is set up a small hole through which the molten salt can pass.

Commercial zirconium tetrachloride in reservoier 7 is heated to above 335° C., sublimation temperature of zirconium tetrachloride and in the meantime a valve 10 is opened. The zirconium tetrachloride purified by sublimation is collected in a reservoir 6 having a condenser tube 5.

After collection, the valve 10 is shut, and then the condenser tube 5 is heated to a temperature which provides a pressure slightly higher than an equilibrium pressure of the zirconium tetrachloride in the molten salt, and is introduced into the molten salt through a zirconium tetrachloride feed tube 3 kept in a temperature above the sublimation point (355° C.).

In the electrolysis of the basic invention, the graphite crucible 4 is used as a cathode and a graphite anode 1 of diameter 20 mm and the anode jacket tube 2 are dipped into the molten salt by about 30 mm in depth. The zirconium tetrachloride feed tube 3 is also dipped in the molten salt by about 10 mm in depth. The electrolysis is carred out at a current of 10 A in the range of 1.35~1.97 volt. This electrolysis is carried out with a theoretical amount of electricity (12.65 Ah) which is required for reduction of a total amount of first dissolved zirconium tetrachloride to zirconium trichloride. The sublimation, dissolution and electrolysis are carried out in an atmosphere of argon.

After termination of the electrolysis, the anode 1 together with the anode jacket 2 in FIG. 1 are pulled out from the top and are exchanged with the steel-made cathode 11 illustrated in FIG. 2. The electrolysis of the second invention is carried out at a voltage below 1 volt with the anode (graphite crucible 4) on which zirconium trichloride is already deposited under the electrolysis of the basic invention.

The condenser tube 5 is, similar to the case of the basic invention, kept in a temperature in which the pressure of zirconium tetrachloride provides a slightly higher pressure than an equilibrium pressure of zirconium tetrachloride in the molten salt, and thus purified zirconium tetrachloride is supplied to the molten salt through the feed tube 3.

A condenser tube 9 in a spiral configuration is set up at the upper part of the molte salt and is kept in a temperature between 150°~200° C. in order to condense mainly zirconium tetrachloride produced from the anode, on which zirconium tetrachloride of a low hafnium content is evaporated. As a result, 60 g of zirconium tetrachloride in which hafnium is contained less than 100 ppm is obtained in a yield of 54.5%. In FIG. 1, 12 is a vessel used.

EXAMPLE 2

100 g of zirconium tetrachloride is dissolved in 1,800 g of a mixture containing NaCl—KCl (50:50 mol) 95 wt% and KF 5 wt% in a manner similar to the case of Example 1, and then the electrolysises of the basic invention and the second invention are carried out at 650° C.±10° C. by operation similar to the case of Example 1.

Consequently, 60 g of zirconium tetrachloride in which hafnium is contained less than 100 ppm is obtained in a yield of 60%.

As those examples are carried out in a laboratory scale, the yields of zirconium tetrachlorides of a hafnium content less than 100 ppm are respectively 54.5% and 60%, but in an inustrial plant, it is prospective for the yield to be more than 80% and zirconium tetrachloride having a hafnium content of above 100 ppm can be reused.

EFFECT OF THE INVENTION

The present invention can show following effects by the above mentioned constitution.

(1) Zirconium trichloride produced by the basic invention contains a hafnium content lower than that of raw material zirconium tetrachloride, and a hafnium content in zirconium tetrachloride produced by the second invention is extremely low, that is, less than 100 ppm, and the yield of the zirconium tetrachloride of extremely low hafnium content can be expected more than 80% in industrial plants.

(2) As the difficulties of conventional technique such as a huge cost of installation and usage of a reducing agent which is difficult in recovering are unnecessary in the present invention, an economical and highly efficient operation becomes possible.

What is claimed is:

1. A process of separation of hafnium from zirconium by molten salt electrolysis comprising of the steps:
   (a) dissolving zirconium tetrachloride containing hafnium tetrachloride in naturally existing ratio in a molten salt, and
   (b) forming zirconium trichloride containing a hafnium content lower than that of said zirconium tetrachloride at a cathode by electrolytic reduction of said zirconium tetrachloride in said molten salt.

2. A process of separation of hafnium from zirconium by molten salt electrolysis comprising of the steps:
   (a) dissolving zirconium tetrachloride containing hafnium tetrachloride in naturally existing ratio in a molten salt,
   (b) forming zirconium trichloride containing a hafnium content lower than that of said zirconium tetrachloride at a cathode by electrolytic reduction of said zirconium tetrachloride in said molten salt, (c) using said cathode on which said zirconium trichloride is formed as an anode with another cathode, and
(d) carrying out said electrolytic reduction of said zirconium tetrachloride at said another cathode in said molten salt and at the same time oxidizing said zirconium trichloride on said anode to zirconium tetrachloride of a low hafnium content and then evaporating said zirconium tetrachloride for separation.

* * * * *